Figure 3:
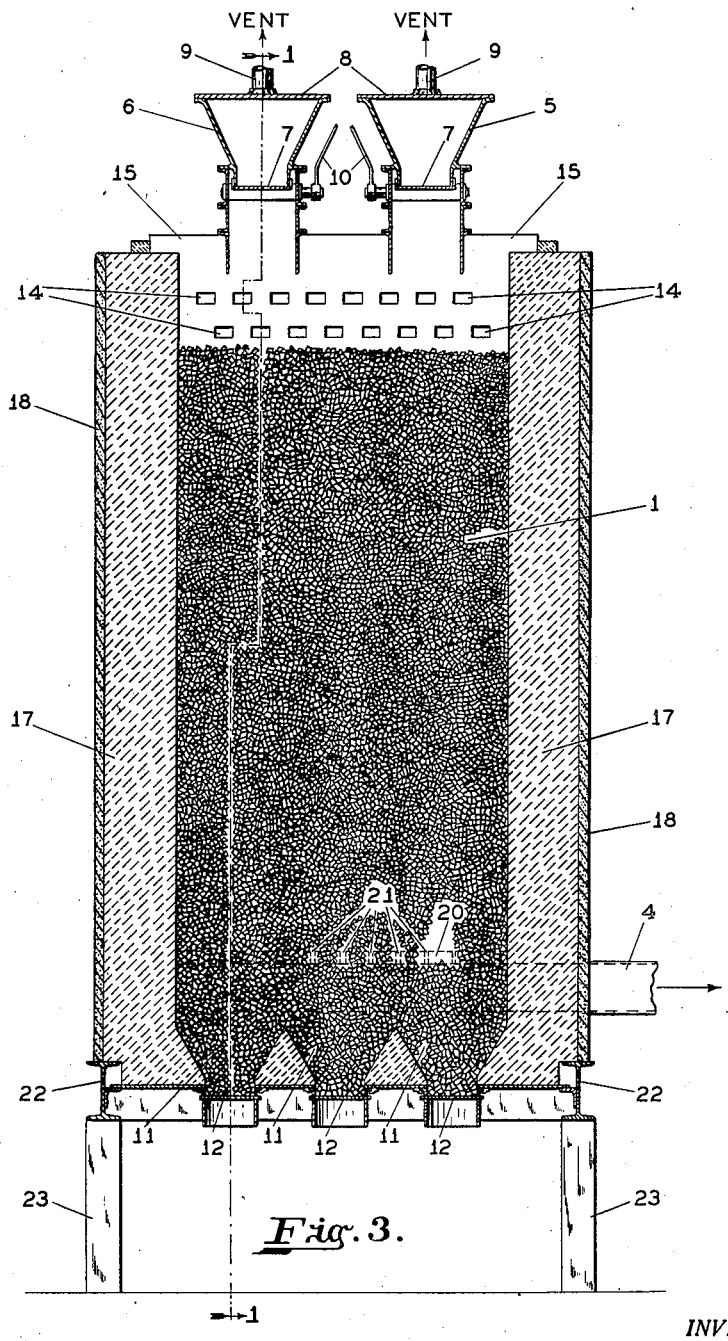

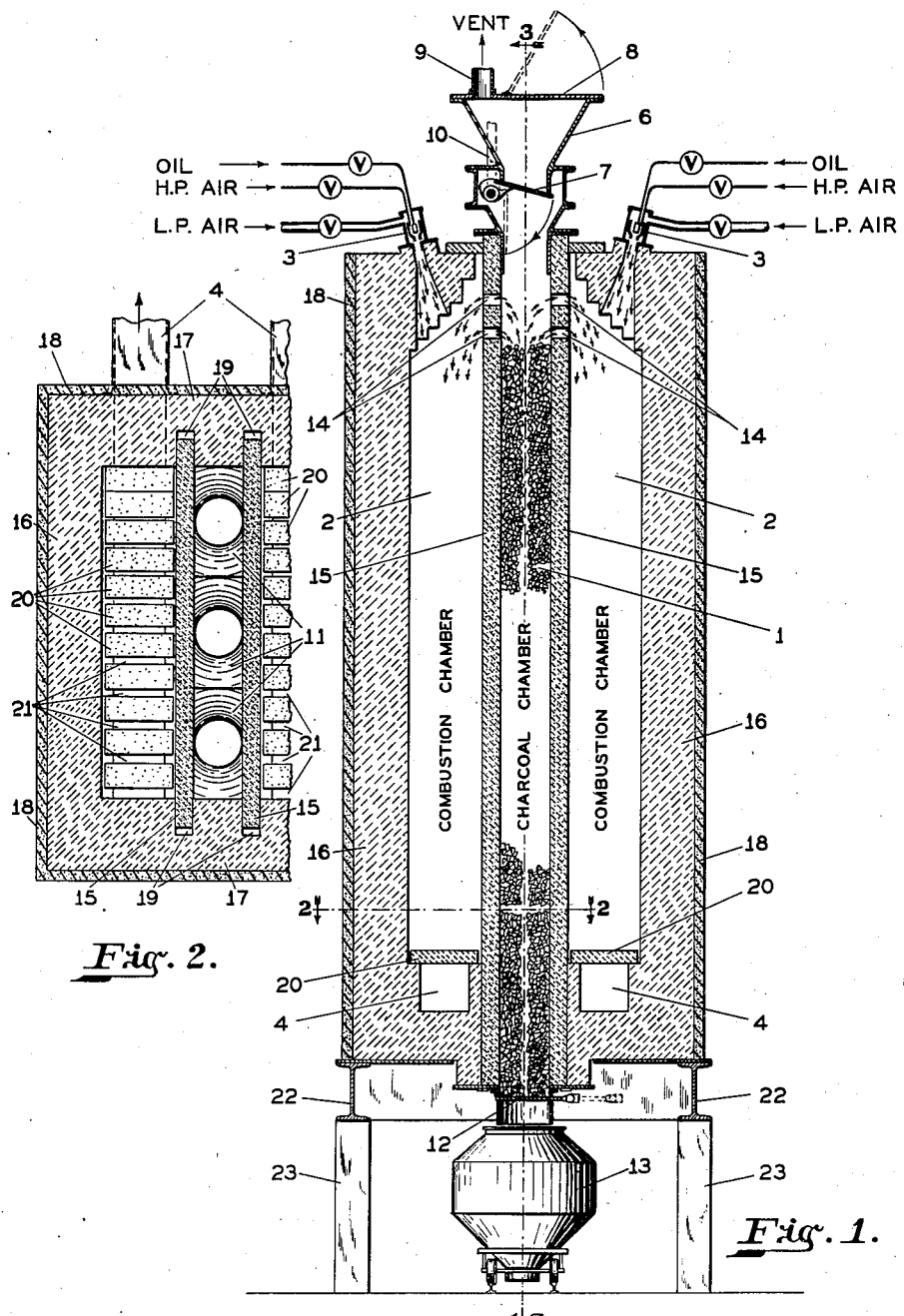

Patented Dec. 10, 1940

2,224,823

UNITED STATES PATENT OFFICE 2,224,823

METHOD FOR DEVOLATILIZING CHARCOAL

Harold E. Klein and Willard S. McVay, Niagara Falls, N. Y., assignors to E. I. du Pont de Nemours & Company, Wilmington, Del., a corporation of Delaware Application July 5, 1938, Serial No. 217,540

3 Claims. (Cl. 202—31)

Our invention relates to the devolatilization of charcoal and more particularly to an improved method therefor and to a furnace in which devolatilization may be accomplished in a more facile and economical manner than has been possible by the use of methods and furnaces heretofore available.

Raw charcoal of commerce usually contains large amounts of volatile materials, and charcoals containing as high as 13–28% volatile materials are common. For many uses such large amounts of volatile constituents are objectionable and can not be tolerated. Thus, in the use of charcoal as a reactant in reactions carried out in liquid media at high temperatures, the presence of appreciable amounts of volatile materials in the charcoal generally renders it unsuitable for use. For example, in the preparation of sodium cyanide from sodium, charcoal and ammonia, the addition to the reaction medium of charcoal having substantial quantities of volatile material causes the contents of the reaction pot to surge and foam, rendering operation of the process hazardous and its control difficult. Charcoal which is substantially completely devolatilized is required for many other well-known uses. In order to render the charcoal of commerce suitable for such purposes it is the general practice to subject it, prior to use, to a heat treatment at temperatures sufficiently high to effect the required removal of volatile constituents.

The usual method for effecting devolatilization is to heat the raw charcoal to a temperature of 750–1000° C. in a vertical shaft furnace. The required heat is derived from a partial combustion of the charcoal undergoing devolatilization. The temperature to which the material is subjected is regulated by controlling the amount of air supplied to the charcoal which controls the extent of the partial combustion. The yield of devolatilized or "glowed" charcoal obtainable by this method depends, of course, on the amount of volatile material in the raw product. Generally the yield is in the neighborhood of 10 to 25% lower than the yield theoretically obtainable if only volatile constituents were removed from the charcoal. Higher yields are not possible by this method since the difference between the actual yield and that theoretically possible represents the amount of non-volatile carbon that must be consumed during the partial combustion treatment to furnish the required heat. The loss of non-volatile carbon and the resultant low yield of product are characteristic disadvantages of the partial combustion method of effecting devolatilization.

A further serious disadvantage of the above method is that a consistently uniform product is not obtainable thereby. This non-uniformity of the product is due, to a certain extent, to channeling of the flow of charcoal and air through the vertical shaft, which results in non-uniform temperature distribution in the glower. It also is due, in part, to the fact that the individual lumps or particles of raw charcoal vary appreciably in their activity, which activity controls to a large extent the rate of combustion. Thus, lumps or particles of high activity burn more readily than those of lower activity and thus are subjected to substantially higher temperatures. The result is that a final product is obtained consisting of particles which are thoroughly devolatilized, together with other particles which are only partially devolatilized.

A still further disadvantage of this prior method is that the draught conditions which are necessary for the operation of such a furnace do not permit the use of charcoal containing appreciable quantities of fine material. This fact necessitates the careful handling of the raw charcoal prior to its devolatilization in order that it may not be crushed to produce appreciable amounts of fine materials therein. It is apparent from these disadvantages that the devolatilization of charcoal by a partial combustion method is uneconomical and far from satisfactory from a practical standpoint.

It is an object of our invention to provide an improved method for glowing charcoal which is economical in operation and may be practiced to obtain substantially theoretical yields of a uniform product, said process eliminating or largely overcoming the above mentioned disadvantages, which are characteristic of processes employed heretofore. A further object is to provide an improved furnace which is well suited for the practice of our improved method and whereby substantially theoretical yields of devolatilized charcoal may be obtained in an economical and convenient manner. These and other objects will be apparent from the ensuing description of our invention.

The above objects may be accomplished in accordance with our invention by heating externally a body of charcoal under non-oxidizing conditions, while utilizing the evolved volatile constituents as a source of all or a substantial part of the heat required to effect devolatilization. Closing of the charge from the atmosphere during the heat treatment insures against combustion of the carbon and permits the obtainment of substantially theoretical yields of devolatilized product. The process may be and is preferably operated in a continuous manner, for example, in the furnace illustrated by the appended drawings. Thus, raw charcoal may be periodically added to a body of charcoal undergoing devolatilization while corresponding amounts of devolatilized charcoal are periodically removed therefrom, the volatile materials evolved being burned in a combustion chamber adjacent to the chamber in which devolatilization is being effected so as to supply all or a large part of the heat required to effect the devolatilization. We have discovered that our method, except during starting operations, does not require heat from an auxiliary source when the raw charcoal contains in the neighborhood of 15% or more of volatile materials, and that it may be practiced to obtain devolatilized product in substantially theoretical yields. Furthermore, the process accomplishes uniform devolatilization, the temperature is easily controlled and it may be practiced with excellent results using either coarse or fine charcoal or mixtures thereof.

In the practice of our improved method, the evolved combustible gases are passed directly from the charcoal chamber of the furnace into the adjacent combustion chambers where they are burned, together with a suitable addition of air, to supply heat for the process. This manner of operation takes full advantage of both the sensible heat of the hot combustible gases as they are evolved and of the heat derived from their combustion so that continued operation of the process is in general not dependent upon an auxiliary source of heat. Even though an auxiliary source of heat may be required to maintain the required temperature, as for example when charcoal having appreciably less than about 15% of volatile materials is being treated, this manner of operation is highly advantageous in that it effects an important saving in fuel and permits the obtainment of uniformly devolatilized charcoal in substantially theoretical yields.

Our process does not contemplate storing the combustible gases as they are evolved for subsequent use as fuel for effecting devolatilization of further quantities of charcoal. Such a practice would be wasteful and uneconomical as compared with the present process, since the sensible heat of the hot gases evolved from the charcoal would be dissipated during the storage period and thus would serve no useful purpose. In contrast, both the sensible heat of the hot volatile materials and the heat derived from their combustion is utilized to the fullest extent for maintaining the required heat when the hot combustible gases evolved are passed directly into the combustion chamber and there burned in accordance with our improved method to heat the body of charcoal undergoing devolatilization.

The appended drawings show by way of illustration one form of furnace, which is especially well suited for practicing our invention. Fig. 1 is a vertical cross-sectional view of the furnace taken along line 1—1 of Fig. 3 and Fig. 3 is another vertical cross-sectional view thereof taken along line 3—3 of Fig. 1. Fig. 2 shows a representative part of a horizontal cross-sectional view of the furnace taken along line 2—2 of Fig. 1.

The appended drawings show a furnace having a vertical rectangular charcoal chamber 1 which is flanked on two sides by combustion chambers 2. The top of each combustion chamber is provided with a burner 3, equipped with oil and high and low pressure air feed lines as shown. The bottom of each combustion chamber communicates with a flue 4, which conducts the combustion gases to a stack, not shown in the drawings. The charcoal chamber 1 is provided at its upper end with an arrangement for periodically feeding raw charcoal into the top of the charcoal chamber. This arrangement includes a pair of hoppers 5 and 6 whose bottoms are provided with closure plates 7 adapted to be opened or closed by manipulation of handles 10. The top of each hopper is normally closed by closure plate 8, which is adapted to be opened by raising it to the position shown by the broken lines (Fig. 1). Element 9 at the top of each hopper is a vent for carrying away volatile combustible gases which enter the hopper when bottom closure plate 7 is open. The bottom of the charcoal chamber 1 is provided with funnel shaped discharge members 11, the bottom portions of which are closed, except when charcoal is being withdrawn, by closure plates 12. Fig. 1 also shows a bucket receiver 13, into which charcoal may be discharged from the furnace, the bucket being carried upon a car or vehicle, as shown, so that it may be transported with convenience away from the furnace.

An especially important feature of the furnace is the provision for permitting the escape of combustible volatile materials from the top of the charcoal chamber 1 into the top of the combustion chambers 2 where they are burned to furnish heat for the process. Such an escape of combustible materials is possible due to the arrangement of ports 14 in side walls 15 at a point near the top of the charcoal chamber and above the level of charcoal therein. By means of this feature, once the furnace has been brought to temperature by means of oil burners 3, heating of the furnace may be sustained without the use of the auxiliary oil burners 3 by effecting combustion of the volatile materials evolved as they enter the top of the combustion chambers by way of ports 14. Control of the temperature may be effected by controlling the amount of air admitted to the combustion chamber by way of the low pressure air line shown in Fig. 1.

The side walls 15 of the charcoal chamber 1 are preferably constructed of carborundum ("Carbofrax") tongue and groove bricks, since this construction material is highly resistant to the temperatures employed and is also relatively highly conductive to heat. The outer walls 16 of the combustion chambers 2 and the end walls 17 of the charcoal chamber 1 may be made of firebrick, and we have found it generally desirable to add a layer 18 of insulating brick around the entire outside of the furnace. The voids 19 at the ends of the side walls 15 of the charcoal chamber provide for expansion of walls 15, so that they do not buckle when subjected to high temperatures. Bricks 20, shown at the bottoms of combustion chambers 2, are spaced in such a manner as to insure uniform withdrawal of combustion gases by way of voids 21 from the bottoms of combustion chambers 2 over their entire cross-sectional areas. Thus the bricks at the side of the combustion chambers nearest the flue exits are spaced close together, while those bricks at the side farthest away from the flue exits are spaced relatively wide apart. This arrangement prevents the major volume of combustion gases from taking the shortest path to the flues and stack and aids appreciably in obtaining uniform heating of the charcoal chamber and its contents. The furnace proper is supported, as shown, upon base elements 23 by means of beams 22. Other supporting members may be provided as desired.

We have shown in the drawings a charcoal chamber whose side walls 15 are constructed of carborundum. However, other construction materials may be employed, depending largely upon the temperatures to which the charcoal is subjected. Thus, alloy steels capable of withstanding high temperatures may be employed, and for temperatures not in excess of about 600 to 700° C. cast iron may be used with good results. Also, aluminum oxide or other well known refractory construction materials may be used in accordance with our invention, although in general we prefer to use carborundum brick in forming the side walls of the charcoal chamber. This is because carborundum is highly heat resistant and also relatively highly conductive to heat. It should be pointed out in this connection, however, that a highly heat conductive material is not essential, since the limiting factor is the conduction of heat through the body of charcoal and not through the walls of the charcoal chamber.

In place of the oil burners shown in Fig. 1, gas burners may be employed, or other sources of heat may be used with success. Also, it may be desirable to provide the furnace with means for determining and following the temperature at various points in the charcoal charge, which may be conveniently done by the use of suitably positioned thermocouples. Also, peep-holes, not shown in the drawings, may be provided, for example, at the tops of the combustion chambers, or in other positions, for aiding in regulating the combustion.

We wish it to be understood that the furnace of our invention is not restricted to the specific structural details shown in the appended drawings. Thus, the shape of the charcoal chamber may be altered appreciably without departing from the scope of our invention. For example, a vertical, square or circular chamber may be employed in place of the vertical rectangular chamber shown. However, a vertical rectangular chamber is preferred in that it facilitates heating of the charcoal. Also, the furnace may be constructed to include a plurality of charcoal chambers positioned to form a row with each chamber being separated from adjacent members by an intervening combustion chamber. Furthermore, the number and position of the burners in the combustion chambers may be varied as desired depending upon the size of the furnace and the amount of auxiliary heat required to maintain its operation.

In addition to the above possible modifications, the ports through which the evolved gases pass directly from the charcoal chambers into the combustion chambers may be positioned, if desired, below the level of the charcoal in the charcoal chamber. If this is done, it would be desirable to provide these ports with a grating in order to prevent the passage of charcoal into the combustion chambers. The furnace may be operated by the batch method or continuously as desired. Continuous operation is preferred and such operation may be facilitated by the use of any of the well known devices, e. g., a star valve or the like, which permit continuous withdrawal or entry of materials to a space such as the charcoal chamber without at the same time admitting substantial quantities of air. Or, the pressure in the furnace may be adjusted to substantially atmospheric pressure so that even upon opening of the charcoal chamber, no substantial amount of air will enter therein. Obviously various other modifications in the structure and method of operation of the furnace illustrated in the drawings will be apparent to those skilled in the design and operation of charcoal furnaces and these modifications are to be understood as coming within the scope of our invention.

In operation, charcoal may be fed into charcoal chamber 1 of the drawings by way of hoppers 5 and 6. Care should be maintained to insure that closure plates 7 and 8 are not both open at the same time. When the furnace has been brought to temperature by means of burners 3 and when the evolution of volatile combustible materials from the charcoal charge becomes steady, the burners may be shut off and the furnace maintained at the proper temperature by effecting combustion of the volatile materials at the tops of combustion chambers 2. This may be done by supplying air, for example, by way of the low pressure air line, and the amount of air supplied may be used to regulate the temperature which is to be maintained. In order that the furnace of the drawings may be operated in a substantially continuous manner, devolatilized product is removed periodically from the bottom of the charcoal chamber and corresponding amounts of raw charcoal are fed into the top thereof. We have found that with raw charcoal containing in the neighborhood of 15% or more of volatile materials, heating of the furnace may be self-sufficient, in that no auxiliary heat need be supplied, for example, by operation of burners 3. However, it may be necessary with charcoals of lower volatile content to operate the burners intermittently or at a suitably low rate in order that the required temperature may be maintained. Even when it is necessary to employ auxiliary heat from the burners, the utilization of heat from the volatile combustible materials in accordance with our invention effects a substantial saving in fuel and substantially theoretical yields of product may be obtained.

The temperature that should be maintained in the furnace will depend upon the charcoal being treated and also upon the use for which the devolatilized product is intended. We have found that by maintaining a temperature of about 800–1000° C. in the center of the charcoal charge, a product may be obtained which contains no more than about 2% of volatile materials, which product is uniform and is well suited for many uses, for example in preparing sodium cyanide from sodium, charcoal, and ammonia. However, higher or lower temperatures may be employed in accordance with our invention, depending upon the degree of devolatilization required. Obviously, the temperature and time of treatment employed should be consistent with the extent of devolatilization required for the particular use for which the treated product is intended.

We prefer to construct the outer walls, e. g., elements 16 and 17 in the drawings, of the combustion chambers of dense fire brick and of sufficient thickness to assure adequate heat storage so that slight variations in the rate of evolution of volatile materials will not cause corresponding variations in the temperature to which the charcoal is subjected. This heat storage effect is further improved by the application of insulating material, e. g. element 18 in the drawings, to the outside of the furnace, thus reducing the heat gradient through the fire brick and consequently increasing the amount of heat stored and available. This is important from the standpoint of economy in that it reduces the extent to which the auxiliary heaters need be used and, therefore, increases the operating efficiency of the process.

As stated hereinabove, our furnace may be operated to obtain substantially theoretical yields of devolatilized product, since the fixed carbon in the charcoal is not substantially reduced as is the case in the partial combustion method commonly practiced heretofore. Furthermore, the product obtained from our furnace is uniform and may be either fine or coarse, depending upon whether a fine or coarse raw material is used. The elimination of the use of auxiliary burners after the process has once been started results in a substantial saving in operation, aside from the other advantages of our invention.

We have described in the foregoing preferred embodiments of our improved method and apparatus for devolatilizing charcoal. We wish it to be understood that the various details of structure and procedure hereinabove presented are intended to be illustrative and not restrictive in nature. Our invention includes all such variations, modifications and equivalents as fall within the scope of the appended claims.

We claim:

1. The method of devolatilizing charcoal without effecting substantial reduction of the non-volatile carbon content thereof comprising heating a body of raw charcoal to a temperature of at least 800° C. and burning the hot combustible gaseous materials evolved therefrom without substantial loss of the sensible heat of said gaseous materials in heat exchange relationship with said body but out of direct contact therewith to furnish at least a substantial part of the heat required to effect said devolatilization.

2. The method of devolatilizing charcoal without effecting substantial reduction of the non-volatile carbon content thereof comprising maintaining a body of said charcoal in a zone heated to a temperature of at least 800° C., removing devolatilized charcoal from said body and adding corresponding amounts of raw charcoal to said body at such rates as to insure a relatively constant and uniform evolution of combustible gaseous materials from said body of charcoal, and burning said combustible gaseous materials without substantial loss of the sensible heat thereof in a space adjacent to said body but out of direct contact therewith so as to furnish at least a substantial part of the heat required to maintain said devolatilizing temperature.

3. The method of devolatilizing charcoal without effecting any substantial reduction in the non-volatile content thereof comprising heating externally a body of charcoal to a temperature of 800–1000° C. under substantially non-oxidizing conditions while passing combustible gaseous materials evolved from said body of charcoal as a result of said heating directly into a space adjacent to said body of charcoal but out of direct contact therewith and there burning said combustible materials to furnish at least a substantial part of the heat required to effect said devolatilization.

HAROLD E. KLEIN.
WILLARD S. McVAY.